Oct. 28, 1952 R. M. SOMERS 2,615,197

APPARATUS FOR RECONDITIONING PHONOGRAPH RECORD DISKS

Filed May 16, 1949 2 SHEETS--SHEET 1

INVENTOR
Richard M. Somers
BY Henry Lanahan
ATTORNEY

Oct. 28, 1952 R. M. SOMERS 2,615,197

APPARATUS FOR RECONDITIONING PHONOGRAPH RECORD DISKS

Filed May 16, 1949 2 SHEETS—SHEET 2

INVENTOR
Richard M. Somers
By Henry Lanahan
ATTORNEY

Patented Oct. 28, 1952 2,615,197

UNITED STATES PATENT OFFICE 2,615,197

APPARATUS FOR RECONDITIONING PHONOGRAPH RECORD DISKS

Richard M. Somers, West Orange, N. J., assignor to Thomas A. Edison, Incorporated, West Orange, N. J., a corporation of New Jersey Application May 16, 1949, Serial No. 93,433

7 Claims. (Cl. 18—1)

This invention relates to apparatus for obliterating embossed grooves from used record disks of thermoplastic material.

Many thermoplastic materials, when deformed by cold working, are subject to strain relief and restoration merely by heating, this property being sometimes referred to as "thermo-recovery." For example, thermoplastic materials having this property, which are suitable for phonograph record disks, are copolymerized vinyl acetate and vinyl chloride known as Vinylite, cellulose acetate and ethyl cellulose.

This invention is based on the method disclosed and broadly claimed in my pending application Serial No. 57,522 filed October 30, 1948 (now Patent 2,578,457), and having common ownership with the present invention, which is to heat the record disk to an erasing temperature sufficient to obliterate the record grooves, and to maintain the used portion of the record disk flat without contacting it with any solid object, while the disk is in a heated condition, by gripping the record disk at its center and spinning it about its geometric axis in air.

The present invention resides in variations in the apparatus for reconditioning record disks described in my abovementioned application, and resides more particularly in the features of heating the record disk in a heating chamber or oven, of cooling the record disk after the heating step merely by moving the heating oven away from the disk, of alternatively cooling the record by blowing cool air thereacross either while the record disk is in or out of the oven, of heating the record disk equally from both sides during the heating step, of stopping the rotating means as an incident following a separating of the heating oven from the record disk, of controlling the heating current and/or cooling means by the oven movement, and of providing preset means both for determining the heating interval and the elapse of time until the initiation of the cooling interval.

These and other features and objects of my invention will be apparent from the following description and the appended claims.

In the description of my invention, reference is had to the accompanying drawings, of which:

Figures 1, 1A, 2:
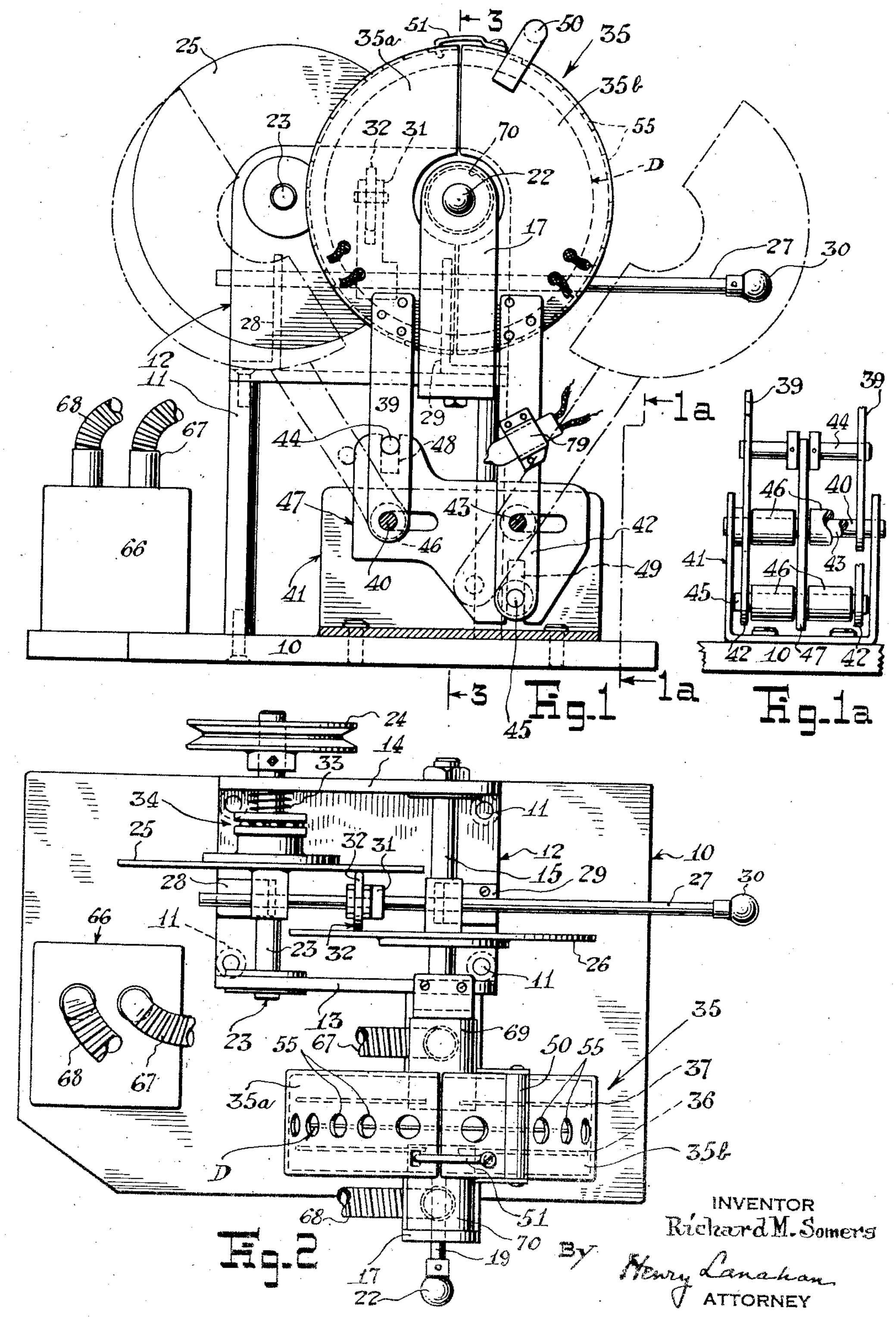
Figure 1 is an elevational view, partly broken away, of a machine for reconditioning record disks according to my invention.
Figure 1A is a fractional elevational view as seen from the line *1a—1a* of Figure 1.
Figure 2 is a top plan view of this machine with parts broken away.

The present machine may comprise a base plate 10 having four upright legs 11 thereon, onto which is mounted a U-member 12. This member 12 provides two upright standards 13 and 14. Journalled in these standards is a horizontal shaft 15 having a cup-shaped clamping member 16 pinned to the forward end portion thereof. Secured to the member 12 is a bracket 17 (Figure 3) which supports a bearing 18 in alignment with the shaft 15. Journalled in this bearing is a shaft 19. On the inner end of this shaft there is a clamping member 20 adapted for engagement with the clamping member 16. Under pressure of a compression spring 21 between the bearing 18 and clamping member 20, the latter is urged into clamping engagement with the member 16. These clamping members grip the hub portion of a record disk D to releasably hold the disk in a plane at right angles to the shafts 15 and 19 for rotation about the geometric axis of the disk. On the outer end of the shaft 19 is a fingerpiece 22 by which the shaft may be gripped to withdraw the clamping member 20 from engagement with the record disk to permit removal of the latter.

Figures 3, 4, 5, 6, 7:
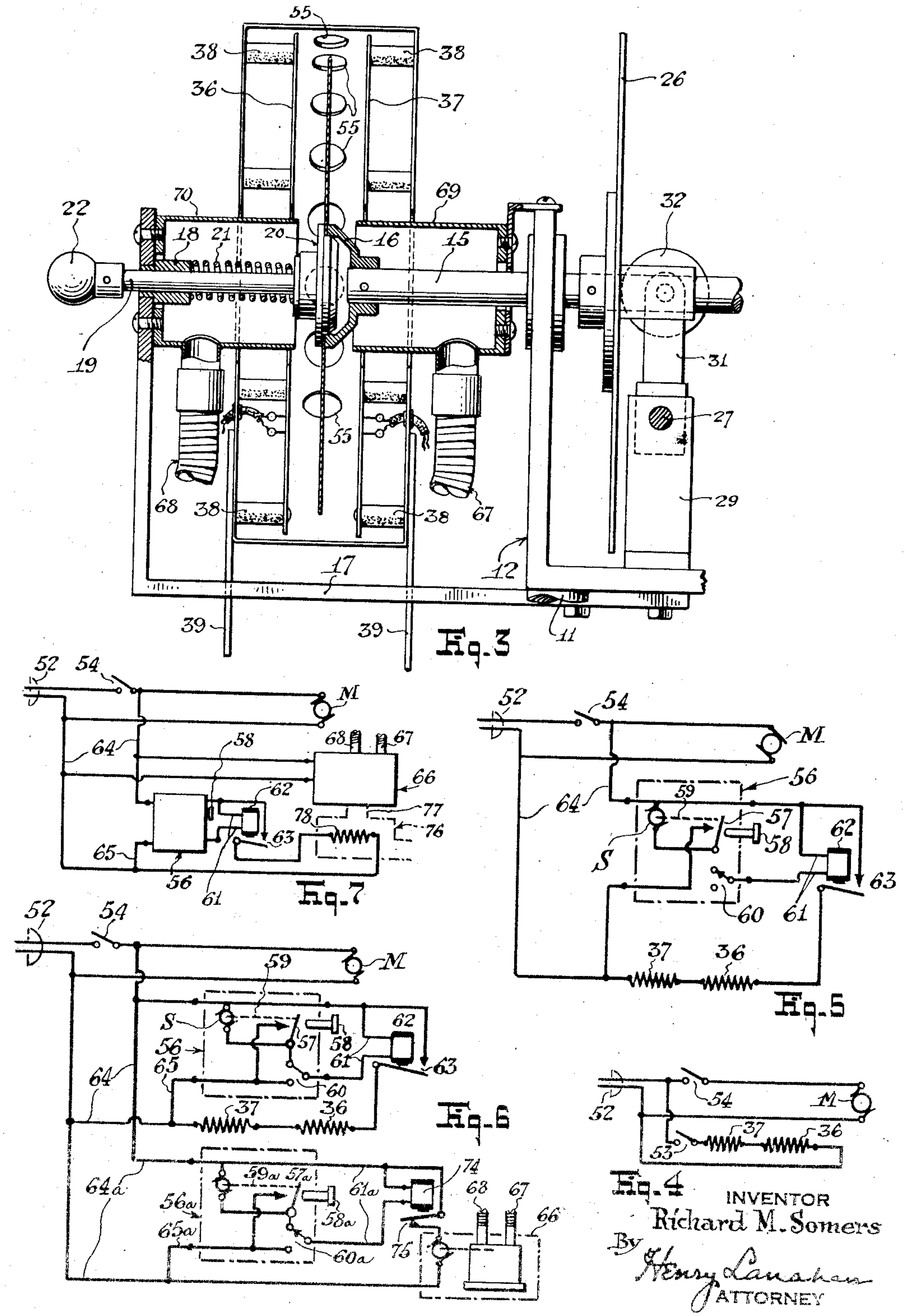
Figure 3 is a fractional section taken on the line 3—3 of Figure 1.
Figures 4, 5, 6 and 7 are schematic diagrams of circuits and apparatus according to different embodiments of the invention.

A variable-ratio drive transmission is provided for driving the record disk D at different selected speeds, as desired. This drive transmission comprises a driven shaft 23 parallel to the shaft 15 and journalled in the standards 13 and 14. On one end of this shaft there is a pulley 24 adapted to be coupled by a belt (not shown) to an electric motor M (Figures 4, 5 and 6). Secured to the shafts 15 and 23 are respective metal disks 25 and 26, each in a plane at right angles to the respective shaft, which have portions overlapping one another (Figure 2). Between these disks and parallel thereto is a rod 27 mounted slidably in standards 28 and 29 secured to the central part of the U-member 12. On the outer end of this rod there is a fingerpiece 30 by which the rod may be gripped and manually positioned in directions lengthwise thereof for reasons which will hereinafter appear. Secured to this rod 27, at a point thereon between the confronting portions of the disks 25 and 26, is an upright slotted member 31 to which is journalled a small wheel 32 on an axis which is parallel to both disks and radial to the shafts 15 and 23. Under pressure provided by a compression spring 33 between the standard 14 and a thrust bearing 34 in abutment with the hub of the disk 25, this latter disk bears against the periphery of the wheel 32 and presses the wheel against the disk 26. The wheel is thus in peripheral contact with both disks and serves to intercouple the two. The ratio of intercoupling depends upon the positioning of the wheel, it being greatest so as to drive the record disk D at a maximum speed when the rod 27 is in an outermost position and being least to drive the record disk at a minimum speed when the rod 27 is in an innermost position.

Surrounding the record disk D is a heating chamber or oven 35 which by way of preferred illustration is cylindrically shaped and divided into two equal sections 35a and 35b, the dividing line being on a plane through the axis of the oven. Within each section there are two heating elements 36 and 37 supported by the end walls of the oven on spacers 38, the end walls being thus in effect a carriage for the heating elements. The heating elements are positioned so as to lie closely adjacent to the opposite sides of the record disk D (Figure 3) to provide equal heating of the record at each side, the heating being such as to raise the disk material to an erasing temperature sufficient to relieve strains therein and to cause obliteration of the record grooves but being insufficient to heat the record to such a high temperature that it would be so weak and soft as to be distorted by the centrifugal force caused by the rotation of the disk. By way of example, a heating temperature of 190° F. and a rotating speed of 750 R. P. M. are considered suitable.

Although it is preferred to provide these heating elements in each oven section, it will be understood that the heating elements may be omitted in one of the oven sections if desired.

Riveted to the end walls of the oven section 35a are parallel depending bars 39 which are pivoted at their lower portions to a rod 40 carried by a U-bracket 41 that is secured to the base 10. In a like manner, two parallel bars 42 are riveted to the end walls of the oven section 35b and depend therefrom. These bars 42 are pivoted at a short distance from their lower ends to a rod 43 that is parallel with the rod 40 and is carried by the bracket 41. The rods 39 and 42 are bridged by respective pins 44 and 45 (Figures 1 and 1A). Slidably mounted for horizontal movement on the pivot rods 40 and 43, and positioned midway therebetween by spacers 46, is a coupling plate 47. This plate has vertical slots 48 and 49 engaged by the pins 44 and 45 respectively. This coupling plate serves to swing open and closed one of the oven sections, say the oven section 35a, when the other section 35b is swung open and closed as by a handle 50 thereon. The outermost or terminal positions of the two oven sections is shown by dash-dot lines in Figure 1. In these open positions of the oven sections, the record is fully exposed to the outside air and in their closed positions they wholly enclose the record disk as indicated in Figure 1. These oven sections are weight-biased outwardly into their open terminal positions, and are held closed by a latch 51 (Figures 1 and 2).

When the record disk has been heated to its erasing temperature by the heating elements 36 and 37, the oven may be opened to leave the disk in the open air to cool. Such cooling will occur fairly rapidly because of the disk being rotated to maintain it flat, notwithstanding that the heating elements are nearby and kept energized. When the disk material has thus cooled to a temperature whereat the material is set, which may be discerned by noting when the disk becomes rigid, the motor is stopped, the spring-pressed clamping member 20 is pulled outwardly and the disk is removed.

The mode of operation just described may be carried out by the simple circuit shown in Figure 4 wherein the plug 52 may be connected to a lighting circuit, say a 110-volt A. C. line. Upon closing the switch 53 the heating elements 36 and 37 are energized, and upon closing the switch 54 the motor is started. After closing the switch 53 to energize the heaters, the operation in reconditioning each disk record is to mount it between the clamping members, to close the motor switch 54, to close the oven 35, to open the oven when the record grooves are erased, to open the switch 54 when the record material is set, and then to remove the record disk.

In a different mode of operation, the record disk may be cooled simply by cutting off the energizing current from the heating elements 36 and 37, while leaving the oven 35 closed. After the heating current is thus cut off the rotating disk will fan the air in the oven to drive out the hot air and to bring in relatively cool outside air. To hasten this cooling action the peripheral wall of the oven may be provided with a series of small ventilating holes 55 as shown.

It is desirable to limit the heating to a preset interval. This may be carried out, by way of illustration, by the circuit arrangement shown in Figure 5. Herein, the motor M is again controlled by the switch 54. This switch may also serve as a master switch for the heating elements 36 and 37. In the heating circuit for the elements 36 and 37 there is, however, a timer 56 for predetermining the heating interval. Only by way of illustration, this timer may be of a "dark room type" such as is used commonly in the photographic field. Such a timer comprises a microswitch 57 closable by a switch button 58 and openable by a synchronous motor S upon expiration of a pre-set time interval established by an adjustable coupling 59 (diagrammatically shown). A single-pole, double-throw switch 60 is provided in the timer 56 for abling and disabling the same, the timer being in effective condition when the switch 60 is in the position shown. The timer controls a circuit 61 which leads to a relay 62, the relay 62 being utilized so as to avoid drawing the heavy current of the heating elements through the microswitch. This relay has a pair of normally-open contacts 63 which are in a line 64 in series with the heating elements 36 and 37, the line 64 being connected to the power supply by way of the switch 54 and the plug 52. The reconditioning of a record disk according to this last-stated mode of operation is as follows:

After installing a record disk in the hub clamp 16—20, closing the oven 35, setting the timer 56 to the desired heating interval, and pressing the timer button 58 to close the microswitch 57, the operator will close the master switch 54. This starts the motor M and, at the same time, supplies current to the relay 62 by way of one side of the line 64, switch 60, microswitch 57, lead 65, and the other side of the line 64. As soon as the relay 62 is thus energized, the contacts 63 are closed to complete the circuit 64 through the heating elements 36 and 37. Upon the expiration of the set time interval of the timer 56, the microswitch 57 is opened to deenergize the relay and shut off the current to the heating elements. Thereafter upon the expiration of a further interval during which the record disk is cooled to set the disk material, the switch 54 is opened to stop the motor, after which the oven is opened and the reconditioned record disk is removed.

As a variation to the last-described mode of operation, the operator may open the oven as soon as the timer has operated to shut off the current to the heating elements, so as to hasten the cooling of a record and thus shorten the time required to carry out the cycle of operations involved in the reconditioning of a record disk.

In another mode of operation of the present apparatus, the record disk may be cooled by shutting off the heater current and blowing cool air across the record disk either while the oven is open or closed. The cooling means for so blowing air across the disk comprises a motor-driven blower unit 66 having two outlet ducts 67 and 68 which lead into the oven at opposite sides of the record disk. By way of illustration, the respective ducts are coupled to respective cup-shaped inlet members 69 and 70 which are in coaxial arrangement with the shafts 15 and 19 respectively. The cup member 69 is held in place by a bracket 71 and leads into the oven through segmental openings 72 provided in the adjacent end walls of the oven sections. The cup member 70 is held in place by the bracket 17 and leads through segmental openings 73 provided in the other end walls of the oven sections. The blower unit takes air in from the room, or cooled air if desired from any suitable source not necessary to show, and blows it into the oven at the center thereof. This cool air flows radially outwardly across the record disk and through the outlet openings 55 of the oven.

The mode of operation described in the foregoing paragraph may be carried out by a circuit arrangement shown in Figure 6. It will be seen that this circuit arrangement is the same as that shown in Figure 5 as far as the drive motor M and the heater elements 36 and 37 are concerned, and that it differs from the foregoing only by the addition of a timing control circuit for the blower unit 66. This additional timing circuit may comprise a timer which is the same as the timer 56 above described; however, to distinguish it from the foregoing, the latter timer and the corresponding parts thereof are given the same reference characters with the suffix letter *a*. This timer 56*a* is in a branch 64*a* of the circuit 64 and controls a circuit 61*a* which leads to a relay 74. This relay has a pair of contacts 75 which are biased closed when the relay is not energized. These contacts and the motor of the blower unit 66 are connected serially in the branch circuit 64*a*.

By providing a separate timer for the blower unit, as above described, the cooling interval is controllable independently of the heating interval and thus the two intervals may be spaced or be made to overlap, as desired. Typically, the timers 56 and 56*a* are set at the same timing so that the cooling means is set into operation concurrently as the current supply to the heating elements is shut off. The operation of the system, when so set, is as follows:

Upon mounting a record disk between the clamping members 16—20, closing the oven 35, pressing the timer-setting buttons 58 and 58*a* and closing the switch 54, the relay 62 is energized to supply current to the heating elements 36 and 37 and the relay 74 is energized to open the contact 75 and maintain the blower unit 66 at a standstill. Upon expiration of the preset time interval of the two timers, the microswitch 57 is opened to deenergize the relay 62 and shut off the heater current and the microswitch 57*a* is opened to deenergize the relay 74 and cause the contacts 75 to close and the blower unit to be put in operation. Cool air from the blower unit is thus blown across the record disk to cool the disk material to its setting temperature. When the disk has cooled, the switch 54 is opened, to stop both the drive motor M and the blower unit, and then the oven is opened and the record disk is removed. Of course, the oven may be opened at any time during the cooling interval, if desired. Also, if it is desired only that the blower start at the instant the heating current is shut off, the relay 74 may be connected to the controlled circuit 61 of the timer 56, and the timer 56*a* may be dispensed with.

A still further modified form of the invention is illustrated in the schematic diagram of Figure 7. Herein a heating unit 76 is provided in an inlet duct 77 of the blower unit 66 and the heater elements 36 and 37 in the oven itself are dispensed with. This heating unit has a heater 78 therein for heating the air as it is drawn thereacross by the blower unit. The air which is so heated is blown by the unit 66 into the oven 35 to heat the record disk to its erasing temperature. During the cooling interval, the heater 78 is shut off so that relatively cool air from the room is blown into the oven to cool the record disk to its setting temperature.

The motor M and the blower unit 66 are connected to the power supply by way of the switch 54 and plug 52, as shown. The heater 78 is operated from this same power supply by way of the switch 54, circuit 64, timer 56 and relay 62. This timer is set by the button 58, as above described, so that when the switch 54 is closed, the relay 62 is operated to close the contacts 63 and to connect the heater 78 to the power supply. Upon the expiration of the preset interval of the timer 56, the same is operated to deenergize the relay 62 and to shut off the current supply to the heater 78. Thereafter, the blower unit will blow unheated air into the heating chamber 35 to cool the record.

The operation of the machine as illustrated in Figure 7 is as follows: After mounting the record disk, pressing the button 58 and closing the oven 35, the operator will close the switch 54 to start the drive motor M and the blower unit 66. Simultaneously as the motor and blower unit are put in operation, the relay 62 is operated to supply current to the heater 78. Thus, hot air is blown immediately into the oven 35 to bring the rotating record disk to its erasing temperature. Upon the elapse of the preset heating interval established by the timer 56, this timer is operated to shut off the current supply to the heater 78. Thereafter, unheated air from the room is blown by the unit 66 into the oven to cool the record disk. When the disk has cooled to its setting temperature, the switch 54 is opened to shut off the motor M and the blower unit 66, the oven 35 is opened and the record disk is removed.

The master switch 54 may be of a mercury type operable by angular movement and may be secured by a clamp 79 to one of the heater oven sections, as to one of the bars 42 (Figure 1). The positioning of the switch on this bar is such that the switch is closed when the oven is closed and is opened as the oven section 55b is moved into a final portion of its opening movement. Such controlling of the switch 54 by the oven, or by a carriage for the heating elements 36 and 37, may be adopted in any of the systems shown in Figures 4, 5, 6 and 7. Also, in the system of Figure 4, the heating elements 36 and 37 may be controlled by this same switch 54. However, with this latter change in Figure 4, and in the event that the systems of Figures 5, 6 and 7 are so utilized that the oven is open during the cooling interval, it will be understood that during this cooling interval the oven is to be held by any suitable means in an open position short of that at which the switch 54 is operated so as to maintain the motor M running and the record disk rotating. At the completion of the cooling interval, the oven sections will be opened to their terminal positions to stop the motor and to shut off the heaters and/or blower unit, as the case may be.

The embodiments of my invention hereinabove described are illustrative and not limitative of my invention as the same are subject to changes and modifications without departure from the scope of my invention, which I endeavor to express according to the following claims.

I claim:

1. In a machine for restoring used thermoplastic phonograph record disks in which grooves have been embossed: the combination of a rotatably-mounted holding means for engaging a central portion of a record disk and supporting the disk for rotation about its geometric axis, means for heating said record disk sufficiently to relieve strains in the disk material, means operable simultaneously with said heating means for rotating said holding means and the disk thereon to maintain the disk flat by centrifugal force while the disk material is in a heated condition, and cooling means including a blower operable simultaneously with said rotating means for blowing cool air onto the disk during rotation thereof to set the disk material.

2. In a machine for restoring used thermoplastic record disks in which grooves have been embossed: the combination of a rotatably-mounted holding means for engaging a central portion of the record disk and supporting the disk for rotation about its geometric axis; a heating chamber movable to enclose said disk and to heat the same sufficiently to relieve strains in the disk material; drive means for rotating said holding means and the disk thereon to maintain the disk flat by centrifugal force while the disk is in a heated condition; and a blower connected to said chamber for blowing cool air thereinto during rotation of the record disk to set the disk material.

3. The combination set forth in claim 2 including means for terminating the heating action of said heating chamber, and timing means for operating said terminating means and for starting said blower.

4. The combination set forth in claim 2 including means for starting said drive means as said disk is enclosed in said heating chamber, means for terminating the heating action of said heating chamber, and respective timing means for said terminating means and blower rendered operative as said drive means is started, said timing means being settable for operating said terminating means and for starting said blower upon expiration of respective preset intervals.

5. The combination set forth in claim 2 including an electrical energizing circuit for said drive means and heating chamber including an on-off master switch, and electrically-operable timing means in said circuit placed in operation upon closure of said master switch and settable to terminate the action of said heating chamber and to start said blower upon expiration of a preset interval following the closing of said master switch.

6. In a machine for restoring used thermoplastic record disks in which grooves have been embossed: the combination of a rotatably-mounted holding means for engaging a central portion of a record disk and for supporting the disk for rotation about its geometric axis; drive means for rotating said holding means and the disk thereon to maintain the disk flat by centrifugal force; a chamber for enclosing the rotating disk; a blower and an associated heater for blowing heated air into said chamber to heat said disk sufficiently to relieve strains therein while the disk is being rotated; and means including a timing device for shutting off said heater after a preset heating interval.

7. The combination set forth in claim 6 including an energizing circuit for said drive means, blower and heater including an on-off master switch, and wherein said timing device is electrically operable and connected to said circuit for operation upon closure of said master switch, said circuit being adapted to maintain said blower in operation after said heater is shut off whereby the blower will thereupon blow relatively cool room air into said chamber to cool said disk.

RICHARD M. SOMERS.

REFERENCES CITED

The following references are of record in the file of this patent:

UNITED STATES PATENTS

| Number | Name | Date |
|---|---|---|
| 2,265,032 | Feyrer | Dec. 2, 1941 |
| 2,340,161 | Van Deventer | Jan. 25, 1944 |
| 2,539,717 | Balmer | Jan. 30, 1951 |